United States Patent
Lynn et al.

(10) Patent No.: US 6,871,745 B2
(45) Date of Patent: Mar. 29, 2005

(54) DISTRIBUTOR APPARATUS FOR PROVIDING A UNIFORM DISCHARGE OF MATERIAL

(76) Inventors: John D. Lynn, 4590 Calvert Pl., Center Valley, PA (US) 18034; Alvin M. Nestler, 2764 Wassergass Rd., Hellertown, PA (US) 18055; Nazareno M. Medei, 708 W. Goepp St., Bethlehem, PA (US) 18018

( * ) Notice: Subject to any disclaimer, the term of this patent is extended or adjusted under 35 U.S.C. 154(b) by 130 days.

(21) Appl. No.: 10/324,323

(22) Filed: Dec. 20, 2002

(65) Prior Publication Data

US 2004/0118768 A1 Jun. 24, 2004

(51) Int. Cl.$^7$ ................................................ B01D 33/72
(52) U.S. Cl. ........................ 210/456; 210/400; 209/254
(58) Field of Search ................... 210/400, 401, 210/456, 405, 783; 209/254; 193/2 R, 4, 17; 198/525

(56) References Cited

U.S. PATENT DOCUMENTS

| | | | |
|---|---|---|---|
| 957,818 A | * | 5/1910 | Traylor ....................... 209/270 |
| 1,037,221 A | | 9/1912 | Dull |
| 3,531,404 A | | 9/1970 | Goodman et al. |
| 4,602,998 A | | 7/1986 | Goron |
| 4,895,653 A | | 1/1990 | Cherochak |
| 4,951,805 A | | 8/1990 | Gordon et al. |
| 4,964,334 A | | 10/1990 | Jay |
| 4,986,911 A | | 1/1991 | Goron et al. |
| 6,113,800 A | | 9/2000 | Hopkins et al. |

* cited by examiner

Primary Examiner—Matthew O. Savage
(74) Attorney, Agent, or Firm—Harold I. Masteller, Jr.

(57) ABSTRACT

The present invention provides an improved distributor including a conduit having an inlet end to receive incoming slurry and an outlet end to feed slurry onto a treatment apparatus such as a filter. A plurality of spaced apart diverter rows are arranged within the conduit between the inlet and outlet ends including a first diverter row comprising one adjustable diverter that is selectively adjustable to divide incoming slurry into either two slurry streams or into three slurry streams. A last diverter row is provided adjacent the outlet end, and the last row includes a plurality of spaced apart non-adjustable diverters make a last division of the slurry before it is discharged onto the filter. At least one intermediate diverter row is provided between the first and last diverter rows, and the intermediate diverter row may include either spaced apart adjustable diverters that can be selectively adjusted to subdivide slurry streams into either two or three additional slurry streams, spaced apart non-adjustable diverters that subdivide slurry streams into two additional slurry streams, or a combination of both adjustable and non-adjustable spaced apart diverters. The each intermediate diverter row contains at least one more spaced apart diverter than the a previous diverter row and one less spaced apart diverter than a following diverter row.

31 Claims, 8 Drawing Sheets

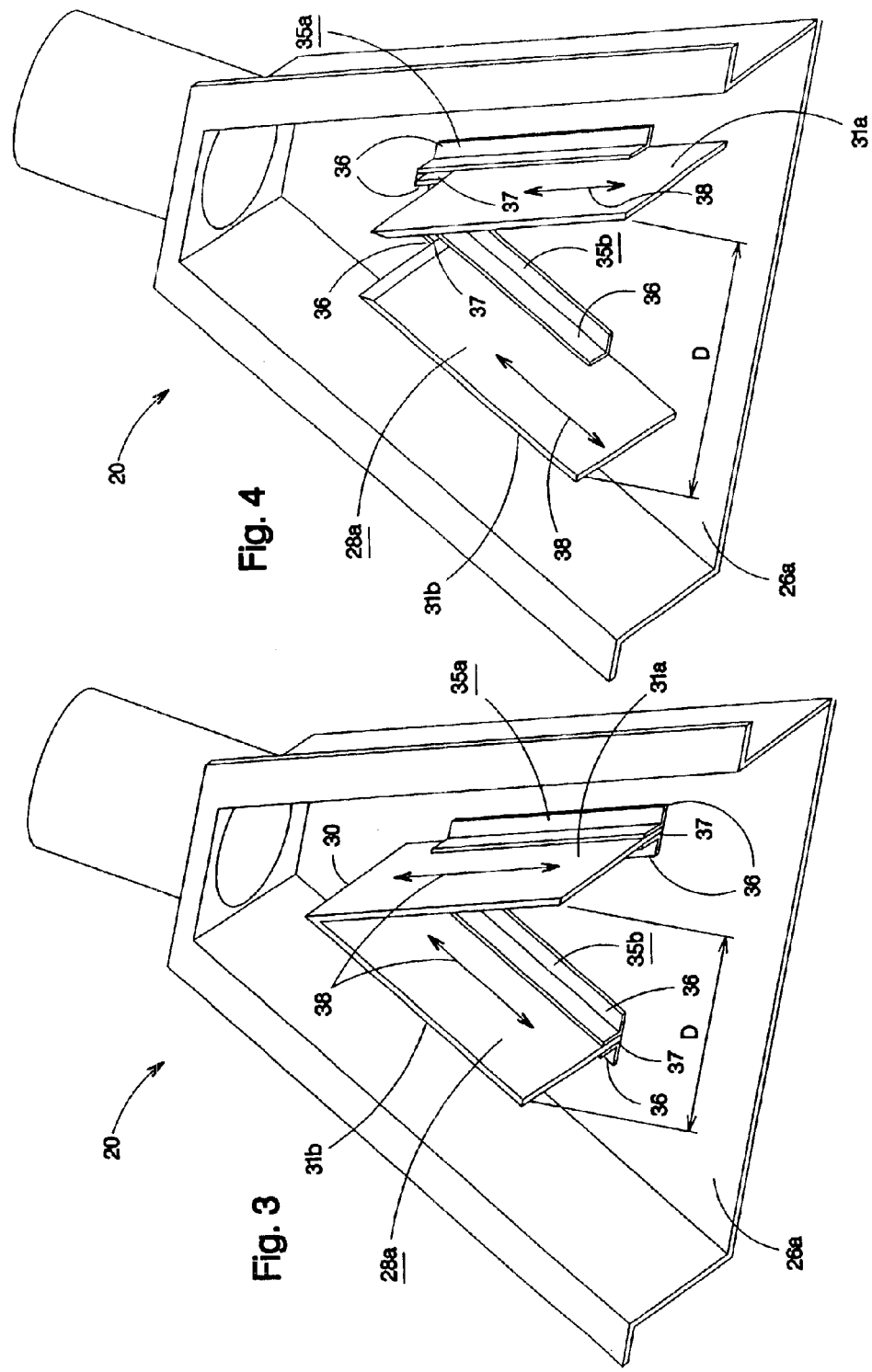

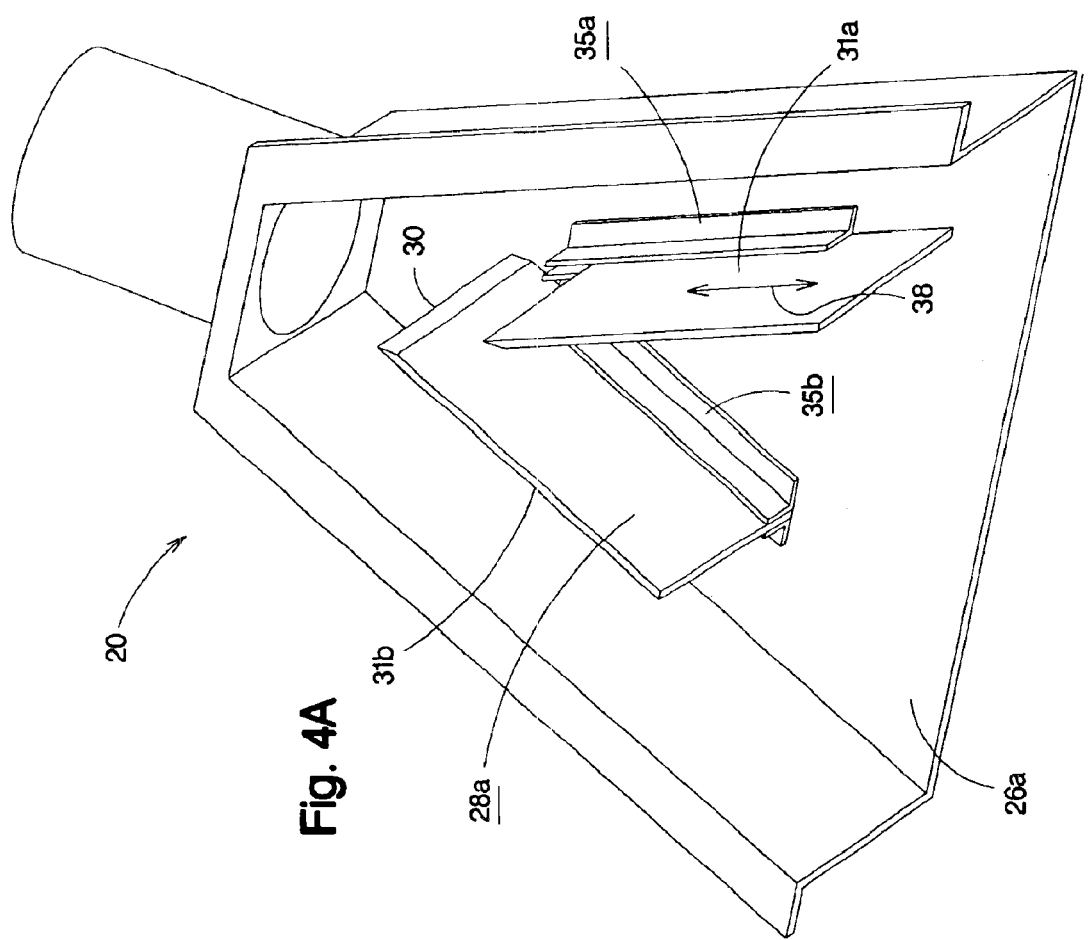

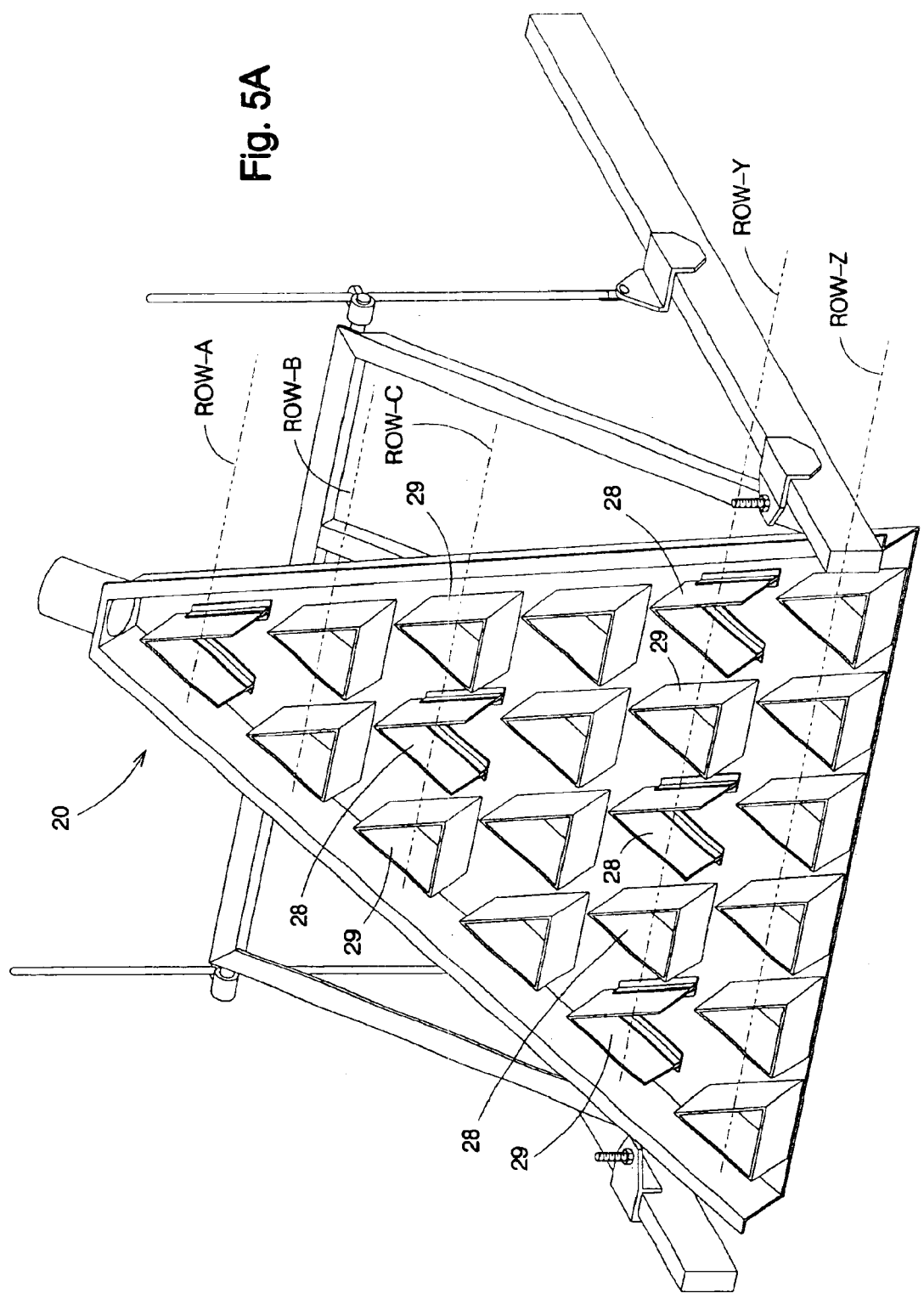

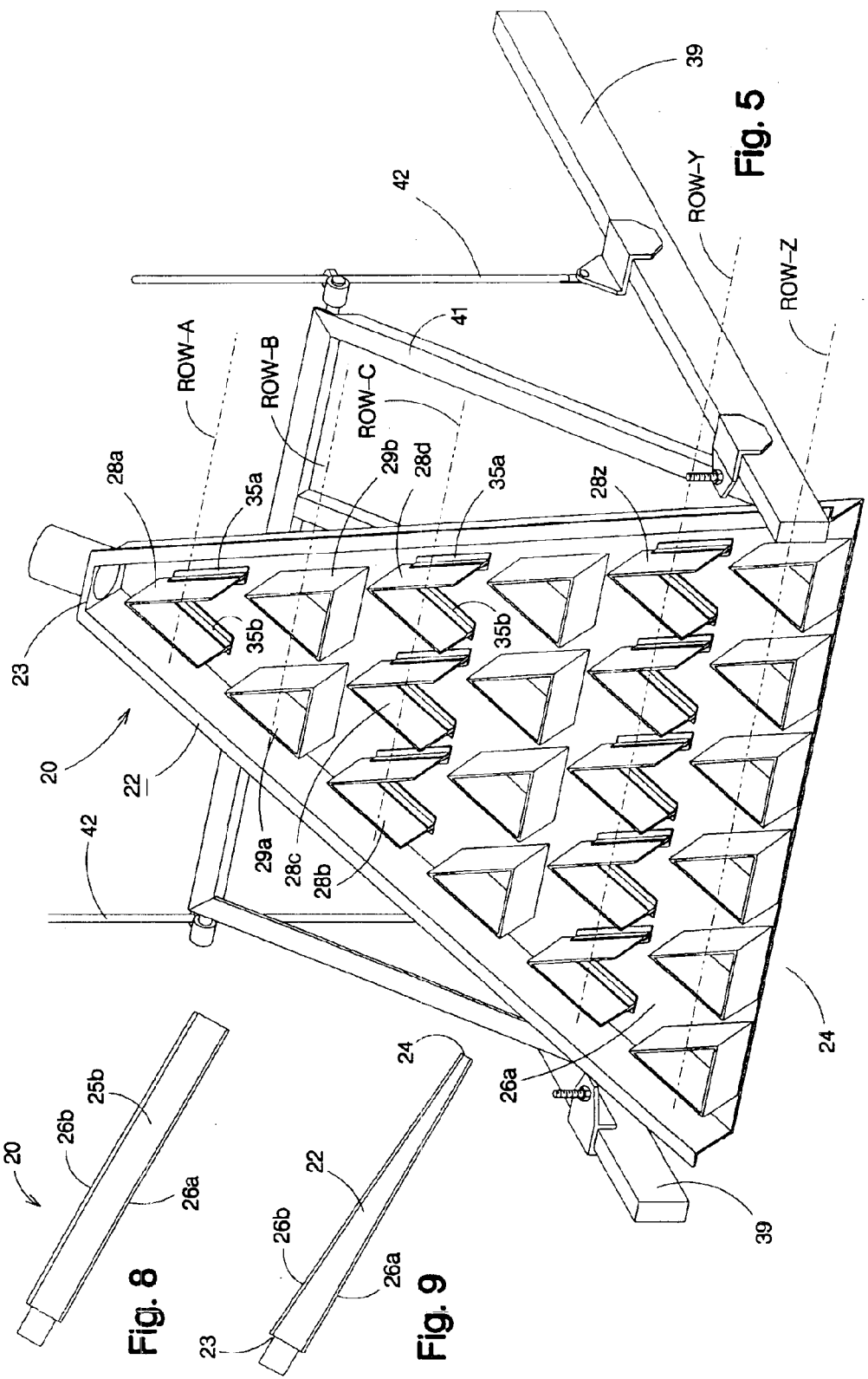

DISTRIBUTOR APPARATUS FOR PROVIDING A UNIFORM DISCHARGE OF MATERIAL

FIELD OF THE INVENTION

The present invention is directed to apparatus that provides a uniform feed of material distributed onto treatment apparatus, and in particular, it is directed to a slurry distributor that provides a uniform feed of slurry distributed across a filter bed, and more specifically, the preferred embodiment of the present invention is directed to a slurry distributor capable of receiving and uniformly distributing across a filter bed, slurry processed in a blast furnace wastewater treatment system for the recovery and/or disposal of solids.

BACKGROUND OF THE INVENTION

Various industries and material handling systems feed wet, slurry like materials through different process steps. For example, in the food industry, dough, batter, coagulated dairy products, etc. must be uniformly fed onto conveyor or processing belts that move such unfinished products along a series of food processing steps. In mining operations, water is used to reduce dust levels at the mines and quarries. The wet freshly mined ores and/or fines are fed onto conveyor belts. Wet ores tend to be sticky, and therefore, they are difficult to distribute uniformly across the endless belts that carry such raw materials away from the mine. In metallurgical industries, including the steelmaking industry, stringent EPA requirements have made it necessary to install gas cleaning and wastewater treatment systems at refining operations in order to meet water and air discharge standards. The effluent generated by such wastewater treatment equipment is often processed to recover valuable metallurgical materials (reverts), and the recovered revert material is recycled back into the manufacturing operation. Wastewater treatment systems usually include a filtration step, and it is necessary to provide a uniform distribution of slurry across the filter belt in order to effectively dewater slurry. Failure to provide a uniform slurry distribution results in poor dewatering of the slurry and/or damage to filter belts.

For example, in a belt filter, slurry is pressed at high pressures between two endless belts. Any irregularity in the slurry distribution such as uneven slurry depth or voids in the slurry material distributed across the belt width will generate high-localized pressures that result in tearing the belts. Such damage requires shutdown of the operation for repair, and therefore, is costly in both time and capital. In instances where the slurry is filtered using a vacuum filter, airflow through the distributed slurry material follows the path of least resistance, and any irregularity in slurry depth will cause rapid dewatering along thinner slurry depths and incomplete dewatering at the thicker slurry depths. Additionally, any voids in the distributed slurry material will cause a complete loss of vacuum and no dewatering of the slurry. In the past, in order to avoid such belt damage and dewatering problems, polymers were added to iron and steelmaking scrubber slurries to form a gelatinous mass that operators were able to rake into a substantially level layer across the width of the filter belts. However, such polymers are expensive additives, and their high cost offset any savings realized by efforts to recover the iron and carbon particles for recycling backing into the manufacturing process. Raking the gelatinous mass also requires the use of additional man-hours to insure an even distribution of slurry is fed onto the filter press.

SUMMARY OF THE INVENTION

It is therefore an object of the present invention to provide a distributor capable of uniformly distributing a material feed onto treatment apparatus.

It is another object of the present invention to provide a distributor having an internal flow control device that provides a uniform material feed distributed across treatment apparatus.

It is still another object of the present invention to provide a distributor having an adjustable flow control device to selectively adjust material feed depth along the width of the material feed distributed onto treatment apparatus.

It is still another object of the present invention to provide an adjustable distributor capable of adjusting material so that no voids are present in the distributed material.

And finally, it is another object of the present invention to provide a distributor that is capable of providing a uniform distribution of metallurgical slurry without a need for polymer additions.

In satisfaction of the foregoing objects and advantages, the present invention provides an improved distributor including a conduit having an inlet end to receive incoming slurry and an outlet end to feed slurry onto a treatment apparatus such as a filter. A plurality of spaced apart diverter rows are arranged within the conduit between the inlet and outlet ends including a first diverter row comprising one adjustable diverter that is selectively adjustable to divide incoming slurry into either two slurry streams or into three slurry streams. A last diverter row is provided adjacent the outlet end, and the last row includes a plurality of spaced apart non-adjustable diverters make a last division of the slurry before it is discharged onto the filter. At least one intermediate diverter row is provided between the first and last diverter rows, and the intermediate diverter row may include either spaced apart adjustable diverters that can be selectively adjusted to subdivide slurry streams into either two or three additional slurry streams, spaced apart non-adjustable diverters that subdivide slurry streams into two additional slurry streams, or a combination of both adjustable and non-adjustable spaced apart diverters. The each intermediate diverter row contains at least one more spaced apart diverter than a previous diverter row and one less spaced apart diverter than a following diverter row.

BRIEF DESCRIPTION OF THE DRAWINGS

The above and other objects, advantages, and novel features of the present invention will become apparent from the following detailed description of the preferred embodiment of the invention illustrated in the accompanying drawings, wherein:

FIG. 3 is an enlarged isometric view of an adjustable chevron in accordance with the present invention.

FIG. 4 is a view similar to FIG. 3 showing both chevron legs adjusted.

FIG. 4A is a view similar to FIG. 3 showing one chevron leg adjusted.

FIG. 5 is an alternate embodiment of the present invention.

FIG. 5A is a second alternate embodiment of the present invention.

FIG. 8 is a side elevation view of the preferred embodiment of the present invention.

FIG. 9 is a side elevation view showing an alternate embodiment of the present invention.

DETAILED DESCRIPTION OF THE PREFERRED EMBODIMENT

Figure 1:
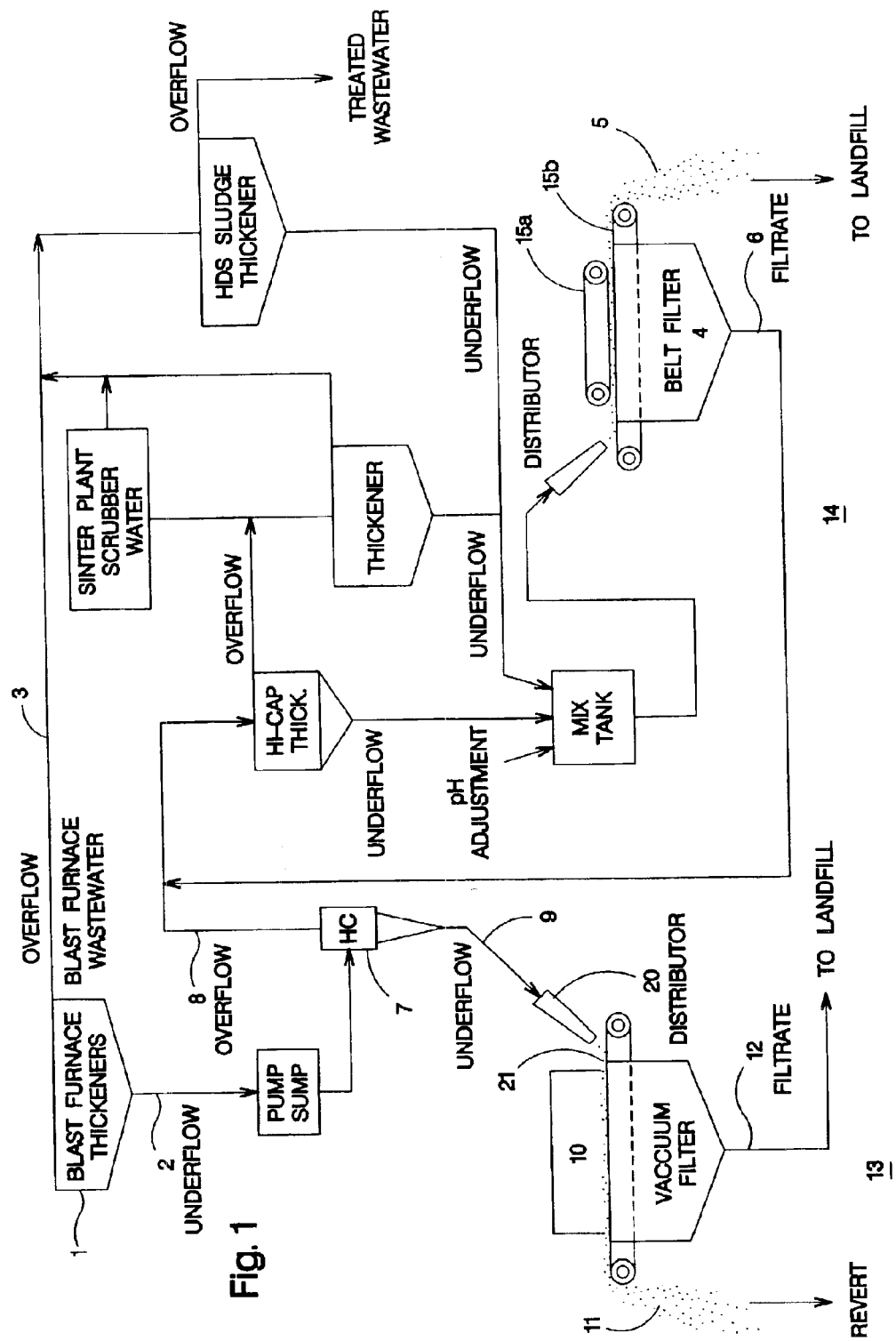
FIG. 1 is a schematic view of a blast furnace wastewater treatment system.

The following detailed description is directed to the preferred embodiment of the present invention. Referring to FIG. 1, in a blast furnace operation, blast furnace gases are treated with wet scrubbers to remove dust particles, and in turn, the scrubber slurry must be treated to remove collected iron-making solids before the wastewater can be discharged to the environment. Scrubber slurry is considered a desirable byproduct because it contains about 36% iron oxides and about 35% carbon by weight, and if such particles are recovered from the slurry, they can be recycled back into the iron making process as a revert. Scrubber slurries also contain heavy metal solids such as zinc and lead particles in amounts of up to about 0.9% and 0.2% by weight respectively. Such heavy metal particles should not be recycled back into the iron making operation, and they must be separated from the wastewater before the waters are discharge to the environment.

It has been discovered that most of the heavy metal particles are contained in the finer fraction (smaller particle size) of the slurry solids, and this discovery of natural partitioning provides a means for size classification and separation of the heavy metals from the other valuable solids. State of the art blast furnace operations include thickeners 1 that separate the coarse fraction (iron/carbon) into an underflow stream 2, and a finer fraction (zinc/lead) into an overflow stream 3. The overflow fraction 3 is further treated in the waste side 14 of the system to provide a suitable wastewater discharge that meets EPA requirements, and the separated solids are dewatered in a filter apparatus 4. The filter cake 5 is treated and/or stabilized so that it is suitable for disposal in a landfill. The filtrate 6 is recycled back into the wastewater treatment system for further separation of solids remaining in the liquid.

The coarse fraction underflow stream 2 is fed to a revert side 13 of the system and separated according to particle size using a hydrocyclone 7. The resulting finer fraction in the hydrocyclone overflow stream 8 is fed to waste side 14 for treatment. The coarse fraction, or hydrocyclone underflow stream 9, is dewatered in a filter 10, and the filter cake 11 is recycled as a revert, and the filtrate 12 is discharged directly to the environment.

Any suitable filter apparatus may be used to dewatering slurry produced in a wastewater treatment system. For example, FIG. 1 shows a vacuum filter 10 used in the revert side 13 of a treatment system, and a belt filter 4 used in waste side 14 of the treatment system. In both instances, distributor apparatus 20, of the present invention, delivers slurry 21 to the filters beds for dewatering. As mentioned above, in the background of the invention, it is necessary to provide a uniform distribution of slurry across filter beds, or filter belts, in order to effectively dewater slurry and prevent belt damage. For instance, in belt filter 4, slurry is pressed at high pressures between two endless belts 15a and 15b. Any irregularities in the slurry distribution, changing depths or voids, will generate high-localized pressures that result in tearing either one or both of the belts 15a or 15b. In vacuum filter 10, such slurry irregularities cause unequal dewatering and no dewatering where voids are present in the distributed slurry layer.

Figure 2:
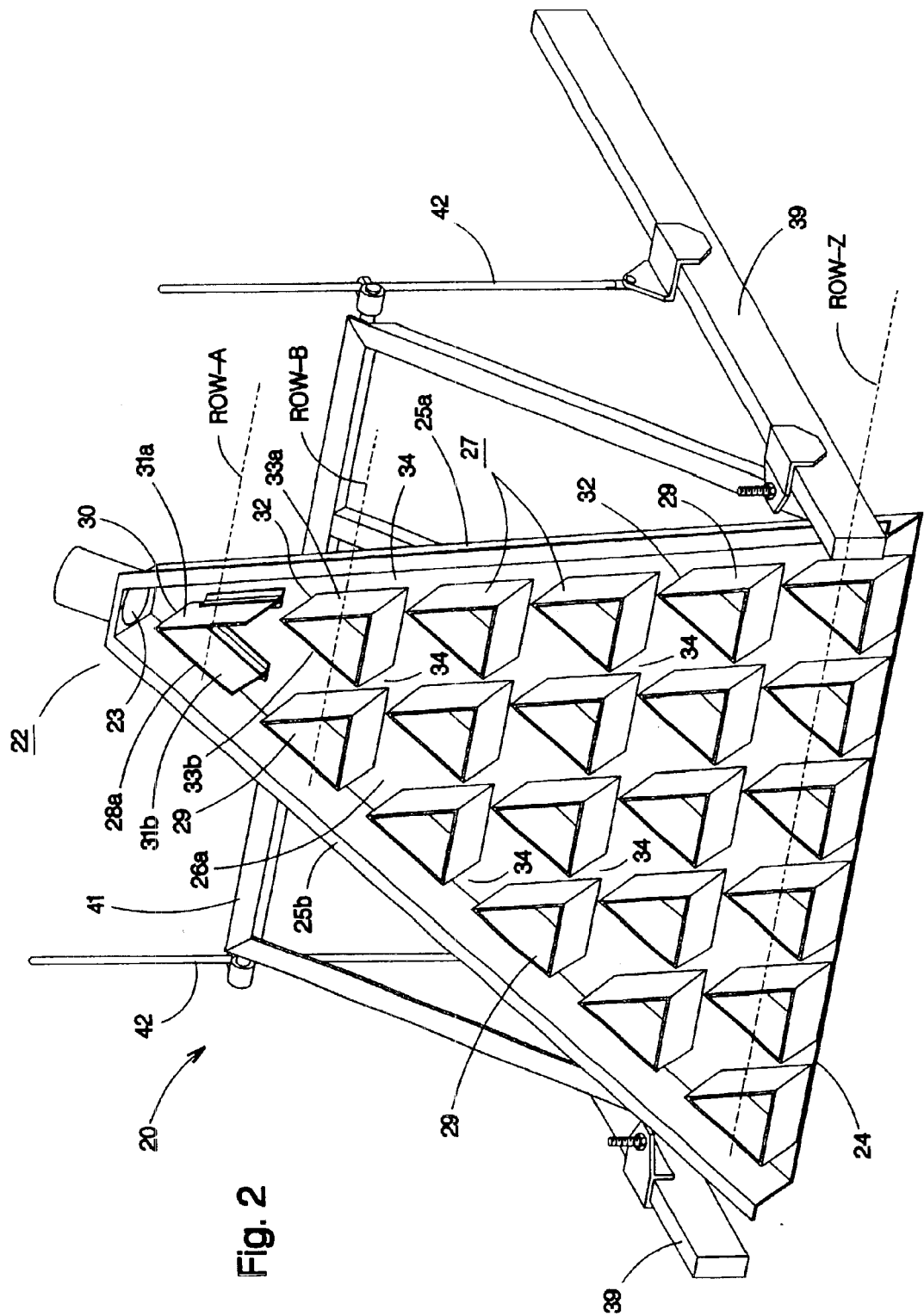
FIG. 2 is an isometric view of the preferred embodiment of the present distributor invention.

Referring to FIG. 2, distributor 20 includes a triangular shaped tube like housing or conduit 22 that delivers a flow of material from an inlet end 23 to an outlet end 24. Inlet end 23 includes an opening having a cross-section area sized to freely receive an incoming stream of material from upstream treatment apparatus, and outlet end 24 having an opening to uniformly distribute the received material onto downstream treatment apparatus. In the preferred embodiment, conduit 22 comprises a pair of converging sidewalls 25a and 25b that extend between a triangular shaped base plate 26a and a corresponding top plate 26b (FIG. 8). The top plate is removed in FIG. 2 to show details within the conduit chamber. A plurality of spaced apart diverters, shown broadly as reference number 27, includes at least one adjustable diverter 28a and non-adjustable diverters 29a through 29z. The spaced apart diverters extend between base plate 26a and top plate 26b in an arrangement of diverters between inlet end 23 to outlet end 24. When the adjustable diverter 28a is changed to its closed position, it comprises an inverted chevron shaped device having the chevron apex 30 pointed in an upstream direction toward inlet end 23. Incoming material impacts upon the upturned apex 30, and the impacting material is divided into two downward flowing material streams along the converging legs 31a and 31b of the chevron shaped diverter. The non-adjustable diverters 29 comprise a triangular shaped device, and they also having an apex 32 pointed in an upstream direction toward inlet end 23 so that incoming material impacts upon apex 32 and is divided into two downward flowing material streams along legs 33a and 33b of the triangular shaped device. The non-adjustable diverters are triangular shaped to improve section properties as compared to the adjustable chevron shaped diverter. However, it should be understood that, the non-adjustable diverters 29 may be inverted chevron shaped devices or any other suitable shaped device as long as the device shape does not obstruct flow of material through distributor 20.

The plurality of spaced apart diverters 27 are preferably arranged in a series of rows "A" through "Z" extending between inlet end 23 and outlet end 24. Each row of spaced apart diverters includes at least one additional diverter 27 than the number of diverters provided in the adjacent upstream diverter row "B" through "Z." The diverters are arranged in rows "A" through "Z" so that each diverter apex, either 30 or 32, is aligned with a gap or space 34 provided between spaced apart diverters or between diverters 27 and adjacent sidewalls, either 25a or 25b, in adjacent upstream or downstream diverter rows.

Referring to FIGS. 3 and 4, diverter 28a is adjustable so that a horizontal distance "D" between the chevron legs 31a and 31b may be increased or decreased to control the material flow through distributor 20. Diverter 28a includes two sets of bracket assemblies 35a and 35b fixed to base plate 26a and/or top plate 26b (FIG. 8). Each bracket assembly includes a pair of spaced apart angles 36 positioned to slidably capture a respective chevron leg, either 31a or 31b, within space 37 provided between angles 36, and horizontal distance "D" is adjusted by moving the respective chevron legs in either an upward or downward diagonal direction within space 37, shown by direction arrows 38. Chevron legs 31a and 31b may be adjusted either symmetrically as shown in the drawing figures or asymmetrically (not shown), depending upon leg positions needed to provide a uniform material distribution from the outlet end. When the chevron legs are adjusted to their closed position (FIG. 3), apex 30 provides a contiguous edge upon which incoming material impacts and the incoming material is divided into two downward flowing material streams along legs 31a and 31b of adjustable diverter 28a, or the plurality of adjustable diverters 28a through 28z in FIG. 5. When the chevron legs are adjusted to open positions (FIGS. 4 and 4A), a space is provided between the chevron legs 31a and 31b, and incoming material is divided into three downward streams, one stream flowing between the spaced apart legs 31a and 31b and two downward material streams flowing along the outside surface of their respective legs 31a and 31b. Such chevron leg adjustment provides means for controlling material flow through distributor 20 so that downstream treatment apparatus receives a uniform discharge of material from the distributor.

Referring to FIGS. 4 and 4A, the adjustable chevron legs are held in place within bracket assemblies 35a and 35b by either friction or by fasteners (not shown). In FIG. 4, both chevron legs 31a and 31b are adjusted within the respective bracket assemblies 35a and 35b to change the distance "D" between the chevron legs. In FIG. 4A, only one chevron leg, for example leg 31a, is adjusted to change distance "D" between the chevron legs. Such double leg and single leg adjustment in the diverters 28a through 28z provides improved control with respect to dividing and/or subdividing the incoming material. It should also be understood that, although the preferred embodiment shows distance "D" adjusted by moving the chevron legs in either an upward or downward diagonal direction, means may be provided to move the chevron legs in a horizontal direction with respect to each other to adjust distance "D". Additionally, distributor 20 is positioned between, and pivotally attached to, a pair of beams 39 and the distributor is supported on a rack 41 that is either raised or lowered using an adjustment means 42 so that the angle of repose for the distributor may be adjusted in combination with diverter adjustment to facilitate material flow through distributor 20.

Referring to FIG. 5, an alternate embodiment of the present invention is shown comprising a distributor 20 that includes a triangular shaped conduit 22 having an inlet end 23 and an outlet end 24 similar to FIG. 2. In the alternate embodiment, the spaced apart diverters may include alternating rows of adjustable diverters, for example, and not limited to, an adjustable diverter 28a in row "A", non adjustable diverters 29a and 29b in row "B", and adjustable diverter 28b, 28c, and 28d, in row "C", and so on through to the last adjustable diverter 28z in row "Y" and the last non-adjustable diverter 29z in row "Z". The spaced apart diverters extend between base plate 26a and top plate 26b (FIG. 9) in a series of diverter rows "A" through "Z" from inlet end 23 to outlet end 24. Additionally, as shown in FIG. 9, the depth, or height, of conduit 22 may be tapered from inlet end 23 to a reduced opening height at outlet end 24 so that the cross-sectional area within conduit 22 is filled with material as the material feed spreads across the increasing width of the triangular shaped conduit.

In a second alternate embodiment, shown in FIG. 5A, selected rows in the series of diverter rows "A" through "Z" may include combined non-adjustable diverters 29 and adjustable diverters 28 to provide means for controlling material flow through distributor 20. For example, in FIG. 5A, "ROW-C" and "ROW-Y" are shown having non-adjustable and adjustable diverter arrangements.

Figure 6:
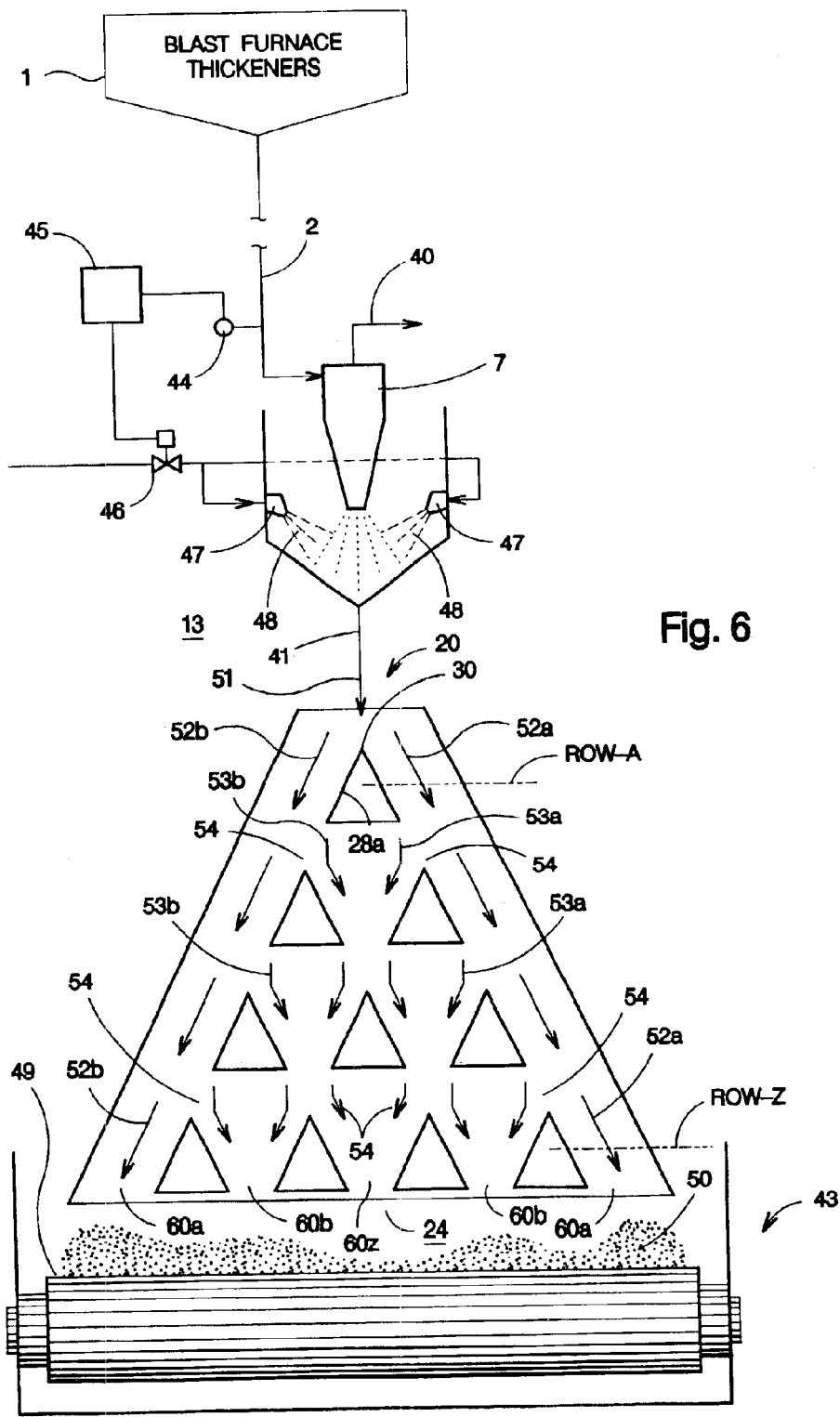
FIG. 6 is a schematic drawing showing unadjusted material distribution onto treatment apparatus.
Figure 7:
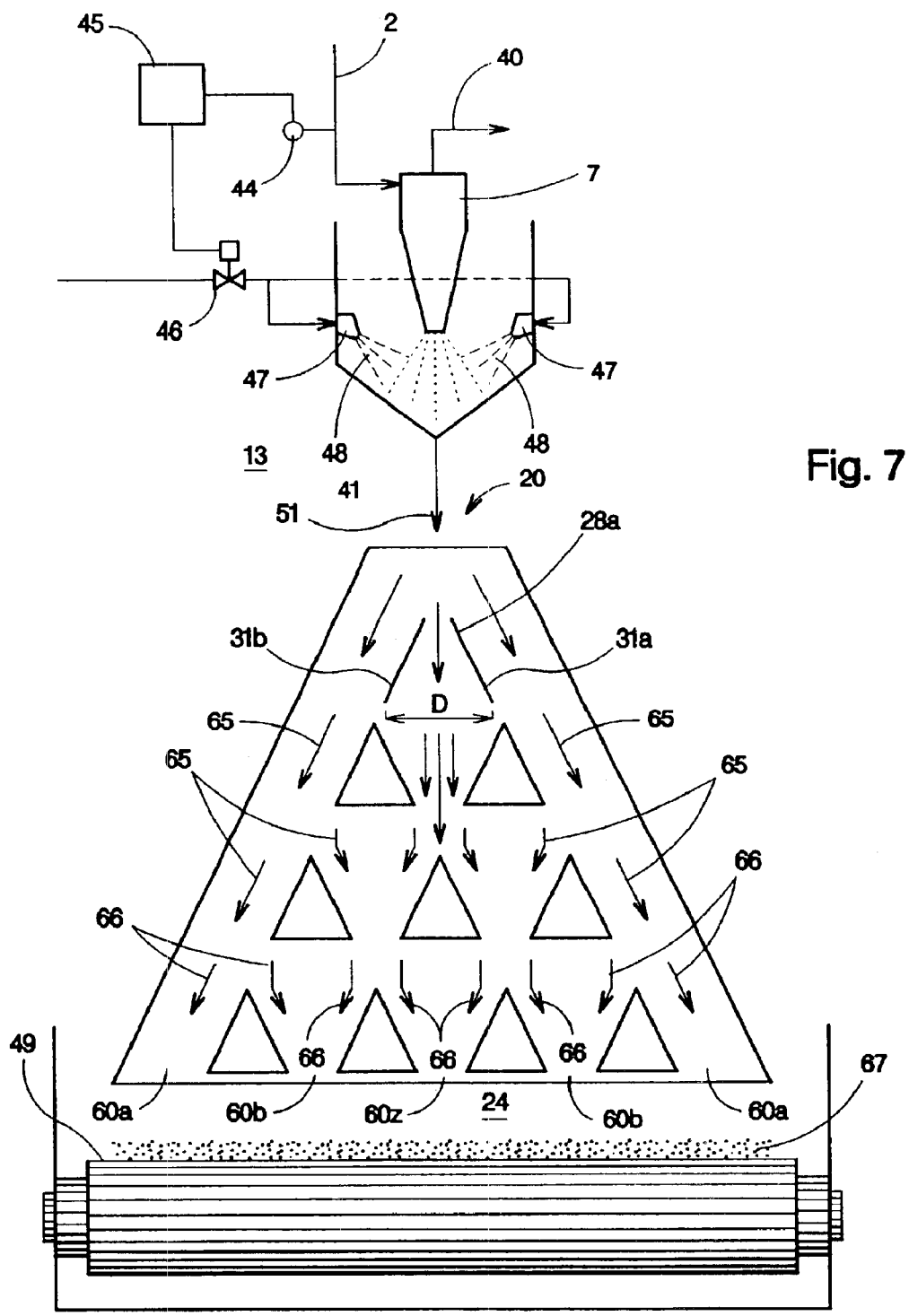
FIG. 7 is a schematic drawing showing adjusted material distributor onto treatment apparatus.

Referring again to FIG. 1, and also to FIGS. 6 and 7 showing the revert side 13 of the blast furnace wastewater treatment system, hydrocyclone 7 receives the coarse iron/carbon containing fraction, the underflow stream 2 from thickener 1, and separates the incoming fraction into secondary overflow and underflow streams 40 and 41 respectively. The finer hydrocyclone overflow fraction 40 is recycled back into the wastewater treatment system where it is further processed to recover additional iron and carbon bearing particles, and the coarse underflow fraction 41 is fed to distributor 20 of the present invention for subsequent dewatering in a downstream filter 43. The moisture content of the hydrocyclone underflow slurry feed 41 is monitored and controlled using sensor probes 44 that transmit signals to a controller 45, and a water spray system that includes an automatic valve system 46 responsive to signals received from controller 45 and nozzles 47 that deliver a controlled water spray 48 so that a slurry feed 41 having a consistent moisture content is fed to distributor 20.

Depending upon flow characteristics of the material feed to distributor 20, the distributor may or may not provide a uniform material discharge onto filter bed 49. If the material discharge is a non-uniform material discharge, as shown with reference number 50 in FIG. 6, the uneven discharge is typically caused by an unequal material flow through distributor 20. For example, in FIG. 6, the unequal slurry flow through the distributor is illustrated by the incoming flow stream arrow 51 that impacts upon apex 30 of adjustable diverter 28a, and the incoming stream is divided into primary slurry flow streams 52a and 52b that comprise the greatest volumetric amount of slurry material flowing through diverter 20. This is illustrated with the longest flow stream arrows 52a and 52b. The primary slurry flows are discharged from distributor 20 through opening spaces 60a provided along outlet end 24. As the primary slurry streams 51a and 51b flow in a downward direction through distributor 20, they are subdivided into secondary slurry flow streams 53a and 53b as slurry from the primary flow falls through spaces 54 between the diverter rows "A" through "Z", the secondary slurry flow streams comprising a lesser amount of slurry material as illustrated by shorter flow stream arrows 53a and 53b. The secondary slurry flow is discharged from distributor 20 through openings 60b provided along outlet end 24. The incoming slurry is repeatedly subdivided as it continuously falls through the spaces 54, and the subdivided slurry is directed toward a center discharge opening 60Z that discharges the smallest amount of slurry as illustrated with the shortest flow stream arrows 54.

As heretofore stated, the present invention enables operators to adjust the material flow moving through distributor 20 so that a uniform distribution of material is received on downstream treatment apparatus. Referring to FIG. 7, responsive to the non-uniform material discharge 50 shown in FIG. 6, diverter 28a, or any one or more of the diverters 28a through 29z shown in FIG. 5, is selectively adjusted to either increase or decrease distance "D" between the chevron legs 31a and 31b so that a controlled slurry flow through distributor 20 provides a uniform slurry distribution across the width of the downstream filter. The controlled slurry flow is illustrated with changing flow stream arrow lengths 65 that result in producing substantially equal amounts of slurry shown as equal flow stream arrows 66 discharged through the openings 60a and 60b through 60z provided in outlet end 24. The equalized slurry discharge from distributor 20 provides a uniform distribution of slurry 67 across filter bed 49.

As such, an invention has been disclosed in terms of preferred embodiments thereof which fulfills each and every one of the objects of the present invention as set forth above and provides new and improved means for uniformly distributing material onto treatment apparatus. Of course, various changes, modifications, and alterations from the teachings of the present invention may be contemplated by those skilled in the art without departing from the intended spirit and scope thereof. It is intended that the present invention only be limited by the terms of the appended claims.

We claim:

1. A distributor to provide a uniform feed of material distributed evenly across a width of a treatment apparatus, said distributor comprising:
    a) a conduit having an inlet end to receive incoming material, and an outlet end to feed the incoming material onto the treatment apparatus, and
    b) a plurality of spaced apart diverters arranged within said conduit between said inlet end and said outlet end, said plurality of diverters including non-adjustable diverters and at least one adjustable diverter, said at least one adjustable diverter capable of selective adjustment to divide the incoming material into divided material streams comprising either two material streams or into three material streams.

2. The invention recited in claim 1 wherein said at least one adjustable diverter is capable of adjustment to control an amount of material contained in each of said three divided material streams.

3. The invention recited in claim 1 including an arrangement of diverters positioned below said at least one adjustable diverter, each diverter in said arrangement of diverters positioned to receive and subdivide at least one of the divided material streams, said arrangement of diverters spaced apart at locations within said conduit to direct said subdivided material streams across a width of said distributor so that said subdivided material streams contain substantially equal amounts of material discharged from said distributor to provide said uniform feed of material distributed evenly across the width of treatment apparatus.

4. The invention recited in claim 3 wherein said arrangement of diverters positioned below said at least one adjustable diverter includes non-adjustable diverters and adjustable diverters, each said adjustable diverter capable of selective adjustment to receive and subdivide said divided material streams into subdivided material streams comprising either two material streams or three material streams.

5. There invention recited in claim 4 wherein said adjustable diverters are capable of individual adjustment to control an amount of material contained in each said subdivided material stream so that when said subdivided material streams are directed across a width of said distributor, said subdivided material streams contain substantially equal amounts of material discharged from said distributor to provide said uniform feed of material distributed evenly across the width of treatment apparatus.

6. The invention recited in claim 1 wherein said at least one adjustable diverter comprises a pair of converging diverter legs attached to an adjustment mechanism operated to increase or decrease a distance between said converging legs.

7. The invention recited in claim 6 wherein each converging diverter leg includes an adjustment mechanism to selectively adjust at least one of said converging diverter legs to increase or decrease said distance between said pair of converging diverter legs.

8. The invention recited in claim 7 wherein said conduit has an opening height at said outlet end less than an opening height at said inlet end.

9. The invention recited in claim 6 wherein said adjustable diverter comprises converging diverter legs adjusted to provide an inverted chevron shape having an apex pointed in an upstream direction toward said inlet end when said adjustable diverter divides a material stream into two material streams.

10. The invention recited in claim 6 wherein said adjustable diverter comprises spaced apart converging diverter legs having a gap there between when said adjustable diverter divides a material stream into three material streams.

11. The invention recited in claim 6 wherein said non-adjustable diverters comprise a shape that includes two converging diverter legs having an apex pointed in an upstream direction toward said inlet end.

12. The invention recited in claim 11 wherein said plurality of spaced apart diverters are arranged in diverter rows between said inlet end and said outlet end, each diverter positioned so that its apex is aligned with a gap provided between spaced apart diverters positioned in an adjacent diverter row.

13. The invention recited in claim 12 wherein said conduit has an outlet end width greater than an inlet end width and each diverter row between said inlet end and said outlet end includes at least one additional diverter than a total number of diverters in a preceding adjacent diverter row.

14. The invention recited in claim 1 including adjustment linkage attached to a conduit support frame to adjust said distributor to a selected angle of repose in combination with a selected diverter adjustment to control flow of said material streams through said diverter.

15. A distributor to provide a uniform feed of material distributed evenly across a width of a treatment apparatus, said distributor comprising:
    a) a conduit having an inlet end to receive incoming material, and an outlet end to feed the incoming material onto the treatment apparatus, and
    b) a plurality of spaced apart diverter rows arranged within said conduit between said inlet end and said outlet end, including:
        i) a first diverter row comprising an adjustable diverter capable of selective adjustment to divide an incoming material stream into either two material streams or into three material streams;
        ii) a last divert row comprising a plurality of spaced apart non-adjustable diverters shaped to divide an impacting material stream into two material streams; and
        iii) at least one intermediate diverter row comprising either spaced apart adjustable diverters capable of selective adjustment to divide an incoming material stream into either two material streams or into three material streams, spaced apart non-adjustable diverters shaped to divide an impacting material stream into two material streams, or a combination thereof, said intermediate diverter row containing at least one more spaced apart diverter than said first diverter row and one less spaced apart diverter than said last diverter row.

16. The invention recited in claim 15 wherein each said adjustable diverter includes an adjustment mechanism attached to a pair of converging diverter legs, said adjustment mechanism capable of being operated to either increase or decrease a distance between said converging diverter legs.

17. The invention recited in claim 16 wherein said adjustment mechanism is capable of being operated to adjust either one or both converging diverter legs to increase or decrease said distance.

18. The invention recited in claim 16 wherein said adjustment mechanism is capable of being operated to decrease said distance so that said adjusted diverter comprises an inverted chevron shape having an apex pointed in an upstream direction toward said inlet end.

19. The invention recited in claim 16 wherein said adjustment mechanism is capable of being operated to either increase or decrease said distance so that said adjusted diverter comprises spaced apart converging diverter legs having a gap there between.

20. The invention recited in claim 16 wherein each said non-adjustable diverter comprise a shape that includes at least two converging diverter legs having an apex pointed in an upstream direction toward said inlet end.

21. The invention recited in claim 20 wherein said plurality of spaced apart diverters are arranged in said diverter rows so that each diverter apex is aligned with a gap provided between spaced apart diverters positioned in an adjacent diverter row.

22. A distributor to discharge a uniform slurry feed distributed evenly across a width of a filter in a wastewater treatment system used for the recovery and/or disposal of solids contained in a metallurgical waste stream, the distributor comprising:
   a) a conduit having an inlet end to receive incoming material, and an outlet end to feed the incoming material onto the treatment apparatus, and
   b) a plurality of spaced apart diverter rows arranged within said conduit between said inlet end and said outlet end, including:
      i) a first diverter row comprising an adjustable diverter capable of selective adjustment to divide an incoming material stream into either two material streams or into three material streams;
      ii) a last divert row comprising a plurality of spaced apart non-adjustable diverters shaped to divide an impacting material stream into two material streams; and
      iii) at least one intermediate diverter row comprising either spaced apart adjustable diverters capable of selective adjustment to divide an incoming material stream into either two material streams or into three material streams, spaced apart non-adjustable diverters shaped to divide an impacting material stream into two material streams, or a combination thereof, said intermediate diverter row containing at least one more spaced apart diverter than said first diverter row and one less spaced apart diverter than said last diverter row.

23. The invention recited in claim 22 wherein each said adjustable diverter includes an adjustment mechanism attached to a pair of converging diverter legs, said adjustment mechanism capable of being operated to either increase or decrease a distance between said converging diverter legs.

24. The invention recited in claim 23 wherein said adjustment mechanism is capable of being operated to adjust either one or both converging diverter legs to increase or decrease said distance.

25. The invention recited in claim 23 wherein said adjustment mechanism is capable of being operated to decrease said distance so that said adjusted diverter comprises an inverted chevron shape having an apex pointed in an upstream direction toward said inlet end.

26. The invention recited in claim 23 wherein said adjustment mechanism is capable of being operated to either increase or decrease said distance so that said adjusted diverter comprises spaced apart converging diverter legs having a gap there between.

27. The invention recited in claim 23 wherein each said non-adjustable diverter comprise a shape that includes at least two converging diverter legs having an apex pointed in an upstream direction toward said inlet end.

28. The invention recited in claim 27 wherein said plurality of spaced apart diverters are arranged in said diverter rows so that each diverter apex is aligned with a gap provided between spaced apart diverters positioned in an adjacent diverter row.

29. The invention recited in claim 22 wherein said wastewater treatment system is a blast furnace wastewater treatment system.

30. The invention recited in claim 22 wherein said wastewater treatment system is a steelmaking wastewater treatment system.

31. A distributor comprising a plurality of spaced apart diverter rows are arranged within the conduit between an inlet and an outlet end, comprising:
   a) a first diverter row including one adjustable diverter that is selectively adjustable to divide incoming slurry into either two slurry streams or into three slurry streams;
   b) last diverter row adjacent the outlet end, said the last row including a plurality of spaced apart non-adjustable diverters make a last division of the slurry before it is discharged from said distributor; and
   c) at least one intermediate diverter row provided between said first and last diverter rows, said intermediate diverter row including either:
      i) spaced apart adjustable diverters that can be selectively adjusted to subdivide slurry streams into either two or three additional slurry streams;
      ii) spaced apart non-adjustable diverters that subdivide slurry streams into two additional slurry streams, or
      iii) a combination of spaced apart adjustable and non-adjustable diverters,
   each intermediate diverter row containing at least one more spaced apart diverter than the a previous diverter row and one less spaced apart diverter than a following diverter row.

* * * * *